United States Patent
Wang et al.

(10) Patent No.: US 10,755,534 B2
(45) Date of Patent: Aug. 25, 2020

(54) MONITORING METHOD AND SYSTEM FOR OFFLINE PAYMENT MACHINE

(71) Applicant: ALIBABA GROUP HOLDING LIMITED, Grand Cayman (KY)

(72) Inventors: Linqing Wang, Hangzhou (CN); Renjiang Miu, Hangzhou (CN); Zongru Zhan, Hangzhou (CN); Xuyang Wan, Hangzhou (CN); Huanmi Yin, Hangzhou (CN); Hong Zhang, Hangzhou (CN); Zhe Han, Hangzhou (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/719,747

(22) Filed: Dec. 18, 2019

(65) Prior Publication Data
US 2020/0202680 A1 Jun. 25, 2020

(30) Foreign Application Priority Data
Dec. 25, 2018 (CN) .......................... 2018 1 1595919

(51) Int. Cl.
*G07F 19/00* (2006.01)
*G06Q 20/10* (2012.01)
*G07D 11/28* (2019.01)
*H04L 9/00* (2006.01)
*G07D 11/32* (2019.01)

(52) U.S. Cl.
CPC ....... *G07F 19/209* (2013.01); *G06Q 20/1085* (2013.01); *G07D 11/28* (2019.01); *G07D 11/32* (2019.01); *G07F 19/206* (2013.01); *H04L 9/008* (2013.01)

(58) Field of Classification Search
CPC ...... G06Q 20/20; G07G 1/0045; G07D 11/00; G07D 11/20
USPC .................................................. 235/379, 383
See application file for complete search history.

(56) References Cited

U.S. PATENT DOCUMENTS

| | | | |
|---|---|---|---|
| 4,689,757 | A | 8/1987 | Downing et al. |
| 4,811,011 | A | 3/1989 | Sollinger |
| 5,224,707 | A | 7/1993 | Martin |
| 5,470,079 | A | 11/1995 | Lestrange et al. |
| 5,940,504 | A | 8/1999 | Griswold |
| 5,970,143 | A | 10/1999 | Schneier et al. |
| 6,334,116 | B1 | 12/2001 | Ganesan et al. |
| 6,362,745 | B1 | 3/2002 | Davis |

(Continued)

FOREIGN PATENT DOCUMENTS

| | | |
|---|---|---|
| CN | 106408764 A | 2/2017 |
| CN | 107103465 A | 8/2017 |

*Primary Examiner* — Daniel St Cyr
(74) *Attorney, Agent, or Firm* — Sheppard Mullin Richter & Hampton LLP

(57) ABSTRACT

Methods, systems, and devices, including computer programs encoded on computer storage media, for monitoring a payment machine are provided. One of the methods includes: monitoring a payment machine's interaction with a terminal; and in response to determining that the payment machine is obtaining payment information from the terminal, sending, in a low-power-consumption communication mode, attribute information of the payment machine to the terminal, causing the terminal to send the attribute information to a server for monitoring an operation status of the payment machine.

20 Claims, 2 Drawing Sheets

Payment Machine Monitoring System

(56) References Cited

U.S. PATENT DOCUMENTS

| | | |
|---|---|---|
| 7,516,103 B1 | 4/2009 | Peitrucha, Jr. et al. |
| 8,180,289 B1 | 5/2012 | Glickman |
| 2001/0019966 A1 | 9/2001 | Idaka |
| 2004/0182970 A1 | 9/2004 | Mollet et al. |
| 2007/0103334 A1 | 5/2007 | Soni |
| 2009/0281891 A1* | 11/2009 | Walker ............... G06Q 30/0238 705/14.38 |
| 2018/0240096 A1* | 8/2018 | Patel .................. G06Q 20/322 |

* cited by examiner

Payment Machine Monitoring System

MONITORING METHOD AND SYSTEM FOR OFFLINE PAYMENT MACHINE

CROSS-REFERENCE TO RELATED APPLICATIONS

This application claims priority to the Chinese patent application No. 201811595919.4, filed on Dec. 25, 2018, and entitled "Monitoring Method and System for Offline Payment Machine," which is incorporated herein by reference in its entirety.

TECHNICAL FIELD

The present specification relates to the field of computer technologies, and in particular, to a method and system for monitoring an offline payment machine.

BACKGROUND

With increasingly popular offline payments, the competition among service providers has become increasingly intense. For example, Alipay™, WeChat™, and other service providers have subsidized offline merchants to purchase terminals and payment machines to promote their respective services. However, whether the subsidized machines are deployed at the agreed or expected locations and whether the subsidized machines are actively used, can be verified only through feedbacks from merchants or through field visits. It is difficult to determine whether the feedback information obtained through manual telephone inquiries is reliable, and the labor cost of field visits is high. As a result, it is difficult to learn the actual performance of the payment machines. The understanding of such performance would provide substantial assistance to service providers in making business decisions and outreach plans. Therefore, it is important to obtain credible data.

SUMMARY

The present specification provides a system and method for monitoring an offline payment machine to obtain credible data of the actual operation status of the payment machines.

According to a first aspect, the specification provides a method for monitoring an offline payment machine. The method can be implemented by a monitoring device, and may include: monitoring a payment machine's interaction with a terminal; and in response to determining the payment machine is obtaining payment information from the terminal, sending, in a low-power-consumption communication mode, attribute information of the payment machine to the terminal, causing the terminal to send the attribute information to a server for monitoring an operation status of the payment machine.

According to a second aspect, the specification provides another method for monitoring a payment machine. The method may include: obtaining, by the payment machine, payment information on a terminal; sending, by the payment machine, the payment information to a host for processing an offline payment; monitoring, by a monitoring device, the payment machine's interaction with the terminal; sending, by the monitoring device, in a low-power-consumption communication mode, attribute information of the payment machine to the terminal; and sending, by the terminal, the attribute information to a server for monitoring operation status of the payment machine.

According to a third aspect, the specification further provides a device for monitoring a payment machine. The device may include one or more processors and one or more non-transitory computer-readable memories coupled to the one or more processors. The one or more non-transitory computer-readable memories may be configured with instructions executable by the one or more processors to perform operations. The operations may include monitoring a payment machine's interaction with a terminal; and when determining the payment machine is obtaining payment information on the terminal, sending, in a low-power-consumption communication mode, attribute information of the payment machine to the terminal, causing the terminal to send the attribute information to a server for monitoring an operation status of the payment machine.

The specification also provides a low-power-consumption monitoring device for a payment machine, comprising a control kernel, a memory, a low-power-consumption communication module, and a power supply, wherein the control kernel functions as a central processor and is connected with the low-power-consumption communication module, the internal memory, and the power supply, respectively; the memory is configured to store attribute information of the monitored payment machine during pre-deployment; the low-power-consumption communication module is configured to send, in a low-power-consumption communication mode, the attribute information of the payment machine; and the power supply is configured to supply power to the control kernel and the low-power-consumption communication module, respectively.

The specification further provides a method for monitoring a payment machine, comprising: a payment machine interacting with a terminal to collect payment information on the terminal and sending the payment information to a host for processing offline payment transactions; a low-power-consumption monitoring device monitoring the payment machine and sending, in a low-power-consumption communication mode, attribute information of the payment machine to the terminal interacting with the payment machine; and a server receiving the attribute information sent by the terminal, so as to monitor the operation status of the payment machine.

The specification still provides a system for monitoring an offline payment machine, comprising: a payment machine configured to interact with a terminal to collect payment information on the terminal and send the payment information to a host for processing offline payment transactions for processing; a low-power-consumption monitoring device configured to monitor the payment machine and send, in a low-power-consumption communication mode, attribute information of the payment machine to the terminal interacting with the payment machine; and a server configured to receive the attribute information sent by the terminal, so as to monitor the operation status of the payment machine.

In the specification, attribute information of the payment machine may be sent by a low-power-consumption monitoring device in a low-power-consumption communication mode to a cloud server via a terminal, so as to monitor the operation status of the payment machine. In this way, the cloud server can collect operation status of a plurality of payment machines of merchants, and learn about information regarding each payment machine, such as location, use condition, whether deployed as expected, and the like, thus assisting the service providers in improving business decisions and promotion results, and reducing idleness and waste of payment machines.

BRIEF DESCRIPTION OF THE DRAWINGS

Various other advantages and benefits may become clear to those skilled in the art by reading the detailed description of the embodiments below. The accompanying drawings are used to illustrate the embodiments and cannot be construed as limitations to the present specification. In all the accompanying drawings, identical reference numerals are used to represent identical parts.

DETAILED DESCRIPTION

The present specification will be described in detail below with reference to the accompanying drawings and embodiments. Embodiments and features in the present specification are detailed descriptions of the technical solutions of the present specification, rather than limitations to the present specification. When there is no conflict, the embodiments and technical features in the embodiments of the present specification can be mutually combined.

The term "and/or" herein describes an association among associated objects and may indicate three types of relationships. For example, A and/or B may indicate three situations of a presence of A only, a presence of A and B simultaneously, and a presence of B only. In addition, the character "/" herein indicates that associated objects before and after the character have an "or" relationship.

Figure 1:
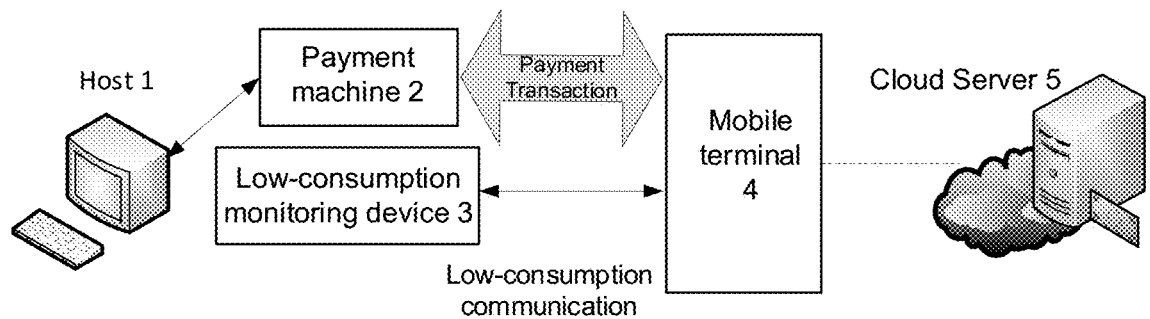
FIG. 1 is a schematic structural diagram of a system for monitoring an offline payment machine according to an embodiment of the present specification.

FIG. 1 illustrates a schematic structural diagram of a system for monitoring an offline payment machine according to an embodiment of the present specification. The system for monitoring an offline payment machine 2 may include: a host 1 configured to process data related to an offline payment transaction; a payment machine 2 configured to communicate with the host and interact with a terminal 4 to collect payment information on the terminal and send the payment information to the host 1 for processing; a low-power-consumption monitoring device 3 configured to send, in a low-power-consumption communication mode, attribute information of the payment machine 2; the terminal 4 configured to perform data interaction with the payment machine 2, provide payment information in the offline payment transaction, and receive the attribute information sent by the low-power-consumption monitoring device 3 in the low-power-consumption communication mode; and a server 5 configured to receive the attribute information of the payment machine 2 sent by the terminal 4, so as to monitor the operation status of the payment machine 2. In some embodiments, the server 5 is a cloud server. In one embodiment, the terminal 4 may be a mobile terminal; and in another embodiment, the terminal 4 is configured as a payment terminal.

In some embodiments, the mobile terminal 4 may not be a fixed component of the system for monitoring the offline payment machine. The mobile terminal 4 may be a mobile phone, an iPad, a tablet computer, a laptop computer, and the like provided or used by a user, and may also be other electronic devices. The host 1 may be a settlement host machine deployed at an offline store or merchant, such as a cash register, a PC, a laptop computer, an iPad, or other various electronic devices, which is not limited herein and may be mainly used for offline payment and payment settlement. Furthermore, the host 1 in the present specification may be a network settlement host based on mobile payments used by users. For example, the host can support Alipay and/or WeChat Pay and other methods, perform real-time settlement in a corresponding payment method in a mobile terminal used by a user, conduct real-time communications with Alipay and/or WeChat Pay network servers via network connection, and process transaction data related to offline payments by the user at a merchant or store.

In some embodiments, the host 1 is further configured to process, based on the payment information on the mobile terminal 4 collected by the payment machine, data related to the offline payment transaction. The host 1 may perform data communications with the payment machine 2, and the payment machine 2 may be configured to collect payment information on the mobile terminal 4 provided by users in the transaction, such as payment codes, coupon codes, or online payment codes. In some embodiments, the payment information on the mobile terminal 4 may be in a form of digital sequence, 2D code, barcode, special pattern, or other stipulated data formats.

The payment machine 2 may be further configured to transmit, via a connection data cable and/or wireless communications, the payment information on the mobile terminal 4 to the host 1 for processing. The host 1 and the payment machine 2 may be matched or configured in pairs, and connected and deployed in a predetermined manner, for example by using a universal connection data line, to perform data interactive transmission according to a predetermined communication protocol. The host 1 is embedded with supporting software to support the payment machine. In one embodiment, the payment machine 2 may also communicate with the host 1 in a wireless communication manner. The host 1 and the payment machine are paired at the time of deployment, such that the host 1 supports subsequent collection of payment information by the payment machine 2 and processes the payment information. In another embodiment, one host 1 may support one or more payment machines 2, and similarly data interaction may be performed in a wired or wireless communication manner. In this case, the supporting software in the host also supports the one or more payment machines to perform simultaneous collection and processing of the payment information, and records and backs up the processed payment information. Correspondingly, one payment machine 2 may also simultaneously communicate with a plurality of hosts 1. For example, the hosts 1 are deployed as a group or in a form of active and standby redundancy.

In some embodiments, the payment machine 2 may be a scanner, a scanning platform, a standard point of sale (POS) machine, a near field communication (NFC) card reader/writer, a smart card reader/writer, or a radio-frequency identification (RFID) reader/writer. In one embodiment, the payment machine 2 may not have an operating system or a display screen. In another embodiment, the payment machine 2 may be a smart terminal device with a camera, which has an internal operating system to support various operations. In yet another embodiment, the payment machine may also have touch-screen display functions for displaying the collection of payment information and providing an operating interface.

In some embodiments, the low-power-consumption monitoring device 3 may include a low-power-consumption communication module configured to send, at a predetermined time interval and in a low-power-consumption communication mode, attribute information of the payment machine. The low-power-consumption communication module may perform communication with low power consumption, including but not limited to low-power-consumption Bluetooth, NB-IoT, CAT M1, and the like. In some embodiments, by embedding a low-power-consumption communication module into or attaching an external low-power-consumption communication module onto the low-power-consumption monitoring device 3, the low-power-consumption monitoring device 3 is capable of performing low power communications.

In some embodiments, the attribute information of the payment machine may be digitalized and written into an internal memory of the low-power-consumption monitoring device 3, such that the low-power-consumption communication module can retrieve and send the attribute information of the payment machine from the internal memory.

In some embodiments, a fixed time interval may be predetermined. For example, the time interval for transmitting the attribute information of the payment machine in a low-power-consumption communication mode can be set at 2 second, 1 minute, 4 hours, etc. Such transmission may be broadcast or multicast, and the attribute information may be transmitted to surrounding devices capable of receiving the attribute information.

In the present specification, the mobile terminal 4 used by a user may have a similar corresponding low-power-consumption communication function, and may be configured to receive, from the low-power-consumption monitoring device 3, the attribute information of the payment machine 2 that is interacting with the mobile terminal 4. The mobile terminal 4 may then send the attribute information to the server 5.

In some embodiments, the payment machine 2 is in data interaction, such as a transaction, with the mobile terminal 4. During the process of collecting payment information from the mobile terminal 4 by the payment machine 2, the low-power-consumption monitoring device 3 may send the attribute information of the payment machine 2 to the mobile terminal 4 conducting the transaction. The attribute information may be sent via the low-power-consumption communication module and at a time interval shorter than the transaction time. The payment machine 2 may be monitored by the low-power-consumption monitoring device 3. For example, if the transaction time requires 8 seconds, the time interval may be set as 2 seconds (2 seconds<8 seconds). In some embodiments, the predetermined time interval is set to be shorter than or equal to the time of data interaction that is ongoing between the monitored payment machine 2 and the mobile terminal 4.

In some embodiments, the mobile terminal 4 includes a terminal adaptation module, such as payment software or payment APP, to match and recognize low-power-consumption communication of the low-power-consumption monitoring device 3. For example, the low-power-consumption communication module may be turned on by function settings of the payment software or payment APP, such that the mobile terminal 4 receives the attribute information of the payment machine 2 in interaction with the mobile terminal 4. The attribute information is from the low-power-consumption monitoring device 3, and then forwarded to the server 5 by the mobile terminal 4. The matching and recognition functions of the software or APP may be set as non-interference and non-perception for other users.

The attribute information of the payment machine 2 may be configured during pre-deployment, and stored into the low-power-consumption communication module or internal memory of the low-power-consumption monitoring device 3. The attribute information of the payment machine 2 to be stored in the low-power-consumption monitoring device 3 may be stored in the form of an embedded storage chip or memory. The storage chip or memory may form an integral piece with the low-power-consumption communication module or may be provided as an independent internal memory in the low-power-consumption monitoring device 3, which is not limited in the present specification.

In some embodiments, the attribute information of the payment machine 2 may be determined according to a pre-deployment agreement or a contract manner. The attribute information includes but is not limited to machine model, production date, hardware function, firmware version, unique identification ID, expected deployment location, and/or expected scenario information, etc. In some embodiments, one, more or all pieces of the above attribute information are set to be in an unchangeable or untampered state and become fixed attribute information after the payment machine 2 has been deployed.

With continuous increase of offline stores or merchants, the amount of the payment machines 2 has become tremendous. One or more pieces of the attribute information of these payment machines 2 are used for multi-dimensional identification and differentiation of each payment machine 2. The expected deployment location and expected scenario information in the attribute information may indicate a geographic location and categories of applications thereof. For example, the expected deployment location may be Xiaomai Restaurant on Wangshang Road, Binjiang District, Hangzhou City, Zhejiang Province or the GUCCI counter in the SKP Mall in Chaoyang District, Beijing, while the expected scenario information may be food and beverage, shopping, drug store, fruit, supermarket, etc.

In some embodiments, the attribute information of the payment machine 2 may include positioning information and timestamp information in use. The system for providing the positioning information may include, but is not limited to, a satellite, mobile network base station, WiFi, UWB (ultra-wideband), or LBS (location-based service) for learning the current geographic position, such as a GPS, Beidou, or base station-based positioning system and the like. In one embodiment, the low-power-consumption monitoring device may include a positioning function module configured to determine, in real time, current geographic position information of the payment machine, and write the current geographic position information into the attribute information for sending out as the positioning information. In another embodiment, the low-power-consumption monitoring device may include a clock control module configured to provide timestamp information. The timestamp information may be added to the attribute information that is sent out in a low-power-consumption communication mode, thereby indicating the active level and operation status of the payment machine.

In some embodiments, the low-power-consumption monitoring device 3 and the payment machine 2 may be physically deployed together in use. For example, the payment machine 2 is deployed within a predetermined distance from the low-power-consumption monitoring device 3. In one embodiment, there may be a data interaction channel between the low-power-consumption monitoring device 3 and the payment machine 2 for monitoring, in a low-power-consumption manner, the obtained positioning information or other scenario information of the payment machine 2. The data interaction channel may be a channel that is constantly open, a channel that is intermittently open, or a channel that is open upon request.

The mobile terminal 4 may be further configured to identify the attribute information sent by the low-power-consumption monitoring device 3 in a low-power-consumption communication mode, and send the identified attribute information to the cloud server 5. The mobile terminal 4 may be a user terminal connected to a mobile network and has low-power-consumption communication functions for connection with other low-power-consumption communication devices 3. The mobile terminal 4 includes, but is not limited to, a mobile phone, an iPad, a tablet computer, a laptop computer, etc., and may be other electronic devices, which is not limited in the present specification.

In some embodiments, the mobile terminal 4 may include software or APP for payment to provide payment information of a corresponding amount in the payment, which is presented to or provided as an input for the payment machine 2. For example, the mobile terminal 4 may provide payment codes, coupon codes, or online payment codes for the payment machine to collect. The payment information on the mobile terminal 4 may be in a form of digital sequence, 2D code, barcode, special pattern, or other stipulated data formats. On this basis, the mobile terminal 4 also has a function of performing low-power-consumption communication with the low-power-consumption monitoring device 3 to receive the attribute information sent by the low-power-consumption monitoring device 3 and forwarding the attribute information to the cloud server 5 for reporting.

In some embodiments, the time for the mobile terminal 4 to receive the attribute information sent by the low-power-consumption monitoring device 3 in a low-power-consumption communication mode, and/or the time for the mobile terminal 4 to forward the attribute information to the cloud server 5, may be before the mobile terminal 4 performs the above payment transaction, during the process of the payment transaction, or after the payment transaction, which is not limited in the present specification. In one embodiment, the mobile terminal 4 may be a mobile terminal being used by the user for payment or another mobile terminal supporting low-power-consumption communications; in another embodiment, the mobile terminal can provide a function for receiving the attribute information of the payment machine 2 and forwarding the attribute information to the cloud server 5. In yet another embodiment, this function may be provided by payment software or an APP in the mobile terminal. In still another embodiment, the mobile terminal 4 may include a terminal adaptation module, which can receive the attribute information of the payment machine from the low-power-consumption monitoring device and send the attribute information to the server 5.

The attribute information of the payment machine transmitted in a low-power-consumption communication mode between the low-power-consumption monitoring device 3 and the mobile terminal 4 may be in a form of plaintext or a form of encrypted cyphertext. If the plaintext form is used, an encryption functional module may be omitted in the low-power-consumption monitoring device 3, which leads to an easy implementation and relatively low cost. In still other embodiments, to ensure that the attribute information of the payment machine is safe and not tampered with, the attribute information transmitted by the low-power-consumption monitoring device 3 can be transmitted in the cyphertext form. A mobile terminal 4 correspondingly supporting the transmission in a low-power-consumption communication mode and capable of decrypting cyphertext can identify the content of the attribute information when the attribute information is received, and then forward the attribute information to a corresponding server, such as the cloud server 5, for processing. As shown in FIG. 1, the cloud server 5 may be one server or a cluster of a plurality of servers for supporting data interaction processing sent from the mobile terminal. Data transmission between the mobile terminal 4 and the cloud server 5 may be performed by means of mobile communication and/or a wireless network. The data transmission may further include the attribute information of the payment machine received by the mobile terminal in a low-power-consumption communication mode, and sent by the mobile terminal to the cloud server in a form of plaintext or cyphertext.

In one embodiment, the cloud server 5 is further configured to extract, from the attribute information, one or more pieces of information including: machine model, production date, hardware function, firmware version, unique identification ID, expected deployment location and/or expected scenario information, positioning information and timestamp information used by the payment machine 2. The one or more pieces of information can be used to monitor the operation status of the payment machine 2. The cloud server 5 may be a network server or a cluster server, and the cloud refers to cloud service functions. In another embodiment, after the mobile terminal 4 provides the payment machine 2 with payment information of the corresponding transaction amount, the transaction server receives feedback that the transaction-related data has been processed by the host, and then notifies the corresponding user mobile terminal that the payment action has been completed. The mobile terminal 4 further receives and identifies the attribute information sent by the low-power-consumption monitoring device 3 in a low-power-consumption communication mode, and then forwards the attribute information to the cloud server 5. Based on the most recently reported attribute information of the payment machine, the cloud server 5 extracts one or more pieces of information including: machine model, production date, hardware function, firmware version, unique identification ID, expected deployment location and/or expected scenario information, positioning information and timestamp information thereof. The one or more pieces of information can be used to monitor and update the operation status of the corresponding payment machine in a database. For a payment machine continuously reporting attribute information having new timestamp information, the cloud server 5 labels the payment machine as in an active state (or an in-use state) in the database. For a payment machine reporting of attribute information having no new timestamp information for a period exceeding a predetermined time interval, the cloud server 5 labels the payment machine as in an inactive state (or a non-use state. For a payment machine first reporting attribute information, the cloud server 5 labels the payment machine as in a newly activated state and records its timestamp information as the time of first use of the payment machine.

The cloud server may perform real-time comparison or sampling to check whether the positioning information in the attribute information of each payment machine in a report by the low-power-consumption monitoring device is consistent with its expected deployment location information. In case of inconsistency, the payment machine may be labeled as to be verified by a field visit in the database. Whether the payment machine 2 is changed in usage without authorization or the inconsistency is caused by errors in information entry during deployment can be determined through further verification. Therefore, the accurate operation status of each payment machine can be effectively monitored.

Figure 2:
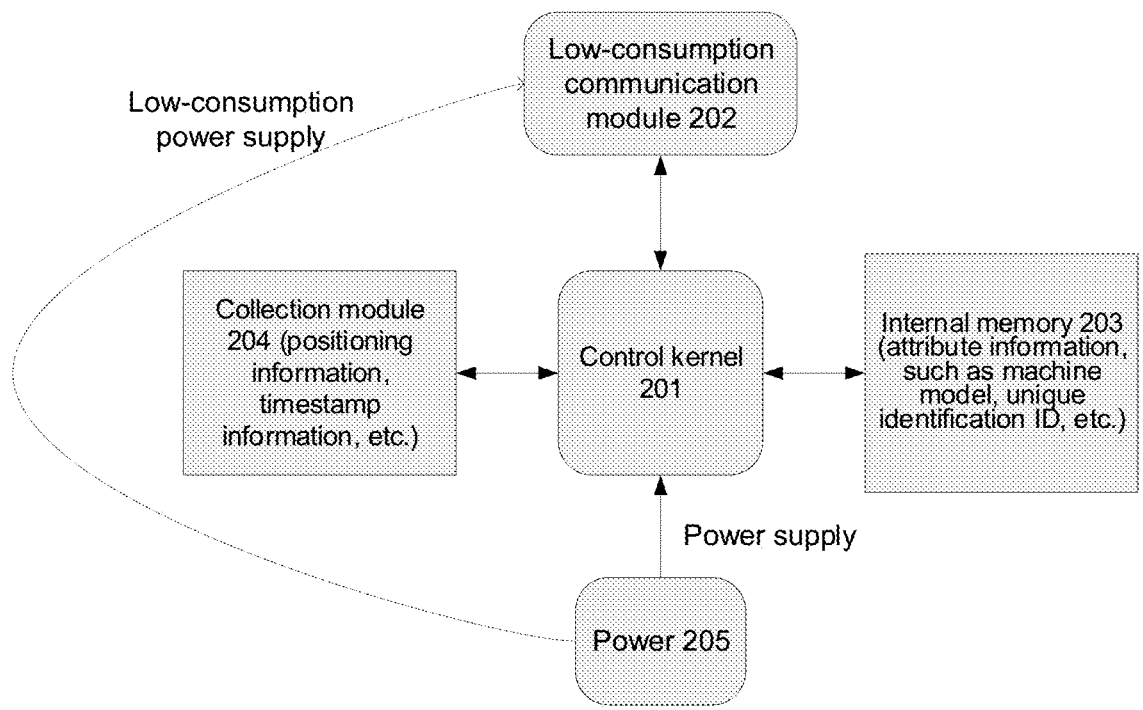
FIG. 2 is a schematic structural diagram illustrating an implementation logic of a low-power-consumption monitoring device according to an embodiment of the present specification.

FIG. 2 is a schematic structural diagram of a low-power-consumption monitoring device according to an embodiment the present specification. In the present embodiment, the low-power-consumption monitoring device comprises a control kernel 201 that functions as a central processor and is connected with a low-power-consumption communication module 202, a collection module 203, a memory 204 (i.e., the internal memory), and a power supply 205, respectively. The collection module 203 is configured to collect scenario information of a payment machine, such as positioning information and timestamp information, and send all the collected positioning information and timestamp information to the control kernel 201 for processing. The internal memory 204 is configured to store attribute information of the payment machine, including machine model, production date, hardware function, firmware version, unique identification ID, expected deployment location and/or expected scenario information.

In some embodiments, the collection module 203 may collect scenario information, such as positioning information and timestamp information, of the payment machine deployed within a predetermined distance from the low-power-consumption monitoring device. The collected positioning information and timestamp information are processed and controlled by the control kernel 201, also stored in the internal memory 204. The above positioning information and timestamp information are further added into the attribute information, which is sent out by the control kernel via the low-power-consumption communication module 202. Namely, the low-power-consumption monitoring device periodically sends out, at a predetermined time interval, in a low-power-consumption communication mode and via the low-power-consumption communication module 202, one or more pieces of the attribute information of the payment machine selected according to actual situations. The attribute information of the payment machine includes but is not limited to machine model, production date, hardware function, firmware version, unique identification ID, expected deployment location and/or expected scenario information, and positioning information and/or timestamp information thereof. Upon receipt by the mobile terminal of the user, the one or more pieces of the attribute information of the payment machine is forwarded to the cloud server for processing and monitoring. The power supply 205 supplies power to the control kernel 201, and also supplies power to the low-power-consumption communication module 202, for example, by charging through a communication signal. The attribute information may also be selected according to operation and maintenance in an implementation scenario. In some embodiments, environmental information, such as ambient temperature, humidity, light intensity, noise level, and air quality, may be sampled and sent to the server. All these data may be used to monitor the operation status of the payment machines.

The internal memory 204 may be a part of the low-power-consumption communication module 202. In still other embodiments, the attribute information may be directly stored into a memory unit in the low-power-consumption communication module 202. Those skilled in the art should know that all these implementation manners fall within the protection scope of the present specification, which is not limited herein.

Figure 3:
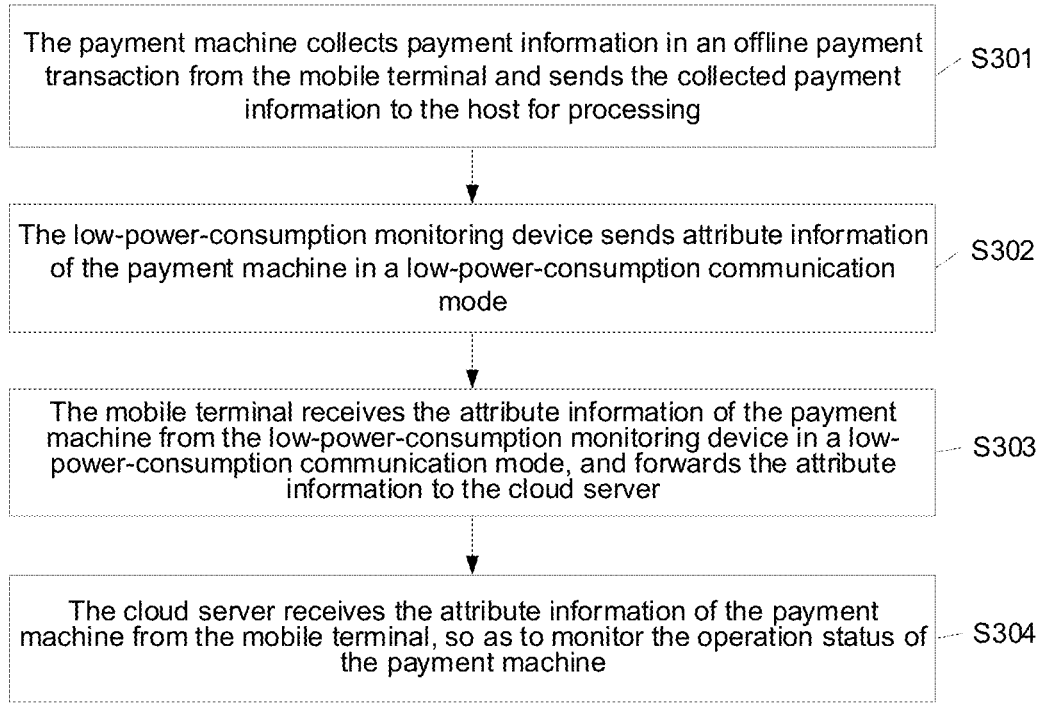
FIG. 3 is a flow chart of a method for monitoring an offline payment machine according to an embodiment of the present specification.

FIG. 3 is a flow chart of a method for monitoring an offline payment machine according to an embodiment of the present specification. The method may include: using a low-power-consumption monitoring device to monitor a payment machine, and sending, in a low-power-consumption communication mode, attribute information of the payment machine to a mobile terminal interacting with the payment machine. The payment machine is configured to interact with the mobile terminal to collect payment information on the mobile terminal, and the payment machine is configured to send the payment information to a host for processing offline payment transactions. A server receives the attribute information of the payment machine sent by the mobile terminal, so as to monitor the operation status of the payment machine. The attribute information of the payment machine is sent by the low-power-consumption monitoring device to the mobile terminal.

In some embodiments, the method for monitoring an offline payment machine may include the following steps.

In step S301: the payment machine collects payment information in an offline payment transaction provided by the mobile terminal and sends the collected payment information to the host for processing.

In step S302: the low-power-consumption monitoring device sends attribute information of the payment machine in a low-power-consumption communication mode.

In step S303: the mobile terminal provides the payment information in the offline payment transaction, receives the attribute information of the payment machine in interaction with the mobile terminal that is sent by the low-power-consumption monitoring device in a low-power-consumption communication mode, and forwards the attribute information to the cloud server.

In step S304: the cloud server receives the attribute information of the payment machine forwarded by the mobile terminal, so as to monitor the operation status of the payment machine.

The mobile terminal may be a mobile phone, an iPad, a tablet computer, a laptop computer, and the like provided or used by a user, and may also be other electronic devices. The host may be a settlement host deployed at an offline store or merchant, such as a cash register, a PC, a laptop computer, an iPad, or various terminal devices, which is not limited herein and is used for offline payment and payment settlement. In still other embodiments, the host is a network settlement host based on mobile payments used by users. For example, the host can support Alipay and/or WeChat Pay and other methods, perform real-time settlement in a corresponding payment method in a mobile terminal used by a user, conduct real-time communications with Alipay and/or WeChat Pay network servers via network connection, and process transaction data related to offline payments by the user at a merchant or store.

In one embodiment, the payment machine communicates with the host, and the payment machine collects payment information on the mobile terminal and provides the payment information to the host for processing data related to the offline payment transaction. Here, the payment machine may be configured to collect payment information on the mobile terminal provided by users in the transactions, such as payment codes, coupon codes, or online payment codes. The payment information on the mobile terminal may be in a form of digital sequence, 2D code, barcode, special pattern, or other stipulated data formats.

In some embodiments, step S301 that the payment machine collects payment information in an offline payment transaction provided by the mobile terminal and sends the collected payment information to the host may further include: the payment machine sending, via a connection data cable and/or wireless communications, the collected payment information on the mobile terminal to the host for processing. The host and the payment machine may be matched or be configured in pairs, and connected and deployed in a predetermined manner, for example by using a universal connection data line, and to perform data interaction and transmission according to a predetermined communication protocol. The host is embedded with supporting software to support the payment machine. In some embodiments, the payment machine may also communicate with the host in a wireless communication manner. The host and the payment machine are paired up at the time of deployment, such that the host supports subsequent collection of payment information by the payment machine and processes the payment information. In some other embodiments, one host may support one or more payment machines, and similarly data interaction may be performed in a wired or wireless communication manner. In this case, the supporting software in the host also supports the one or more payment machines to perform simultaneous collection and processing of the payment information, and records and backs up the processed payment information. Correspondingly, one payment machine may also simultaneously communicate with a plurality of hosts. For example, the hosts are deployed as a group or in a form of active and standby redundancy.

The payment machine in the above method of the present specification may be a scanner, a scanning platform, a standard POS machine, an NFC card reader/writer, a smart card reader/writer, or a RFID reader/writer. In some embodiments, the payment machines does not have an operating system or a display screen. In some other embodiments, the payment machine may also be a smart terminal device with a camera, which has an internal operating system to support various operations. In yet other embodiments, the payment machine may also have touch-screen display functions for displaying the collection of payment information and providing an operating interface.

Step S302 that the low-power-consumption monitoring device sends attribute information of the payment machine in a low-power-consumption communication mode may further include: the low-power-consumption monitoring device sending, at a predetermined time interval and in a low-power-consumption communication mode, attribute information of the payment machine. The low-power-consumption communication module in the low-power-consumption monitoring device may perform communications with low power consumption, including but not limited to low-power-consumption Bluetooth, NB-IoT, CAT M1, and the like. In some embodiments, by embedding a low-power-consumption communication module into or attaching an external low-power-consumption communication module onto the low-power-consumption monitoring device, the low-power-consumption monitoring device is capable of performing low power communications.

In one embodiment, the attribute information of the payment machine may be digitalized and written into an internal memory of the low-power-consumption monitoring device, such that the low-power-consumption communication module can retrieve and send the attribute information of the payment machine in the internal memory.

In one embodiment, a fixed time interval may be predetermined. For example, the time interval for transmitting the attribute information of the payment machine in a low-power-consumption communication mode may be set at 2 seconds, 1 minute, 4 hours, etc. Such transmission may be broadcast or multicast, and the attribute information may be transmitted to surrounding devices capable of receiving the attribute information.

In the present specification, the mobile terminal used by a user may have a similar corresponding low-power-consumption communication function, and may be used to receive, from the low-power-consumption monitoring device, attribute information of the payment machine that is interacting with the mobile terminal and send the attribute information to the server.

In one embodiment, the payment machine is in data interaction, such as a transaction, with the mobile terminal. During the process of collecting the payment information from the payment terminal by the payment machine, the low-power-consumption monitoring device may send the attribute information of the payment machine to the mobile terminal. The attribute information may be sent via the low-power-consumption communication module and at a time interval shorter than the transaction time, both of the payment machine and the mobile terminal are performing the transaction, and the payment machine may be monitored by the low-power-consumption monitoring device. For example, if the transaction time requires 8 seconds, the time interval may be set at 2 seconds (2 seconds<8 seconds). In some embodiments, the predetermined time interval is set to be shorter than or equal to the time of data interaction that is ongoing between the monitored payment machine and the mobile terminal.

In another embodiment, the mobile terminal may include a terminal adaptation module, such as payment software or payment APP, to match and recognize low-power-consumption communication of the low-power-consumption monitoring device. In some embodiments, the low-power-consumption communication module may be turned on by function settings of the payment software or payment APP, such that the mobile terminal receives the attribute information of the payment machine in interaction with the mobile terminal. The attribute information is from the low-power-consumption monitoring device, and then forwarded to the server. The matching and recognition functions of the software or APP may be set as non-interference and non-perception for other users.

In some embodiments, the attribute information of the payment machine may be configured during pre-deployment, and stored into the low-power-consumption communication module or internal memory of the low-power-consumption monitoring device. The attribute information of the payment machine may be stored in the form of an embedded storage chip or memory. The storage chip or memory may form an integral piece with the low-power-consumption communication module or may be provided as an independent internal memory in the low-power-consumption monitoring device, which is not limited in the present specification.

In still another embodiment, the attribute information of the payment machine may be determined according to a pre-deployment agreement or a contract manner. The attribute information includes but is not limited to machine model, production date, hardware function, firmware version, unique identification ID, expected deployment location, and/or expected scenario information, wherein one, more or all pieces of the above attribute information are set to be in an unchangeable or untampered state and become fixed attribute information after the payment machine has been deployed.

With continuous increase of offline stores or merchants, the amount of the payment machines has become tremendous. One or more pieces of the attribute information of these payment machines are used for multi-dimensional identification and differentiation of these payment machines. The expected deployment location and expected scenario information in the attribute information may indicate geographic locations and categories of applications thereof. For example, the expected deployment location is Xiaomai Restaurant on Wangshang Road, Binjiang District, Hangzhou City, Zhejiang Province or the GUCCI counter in the SKP Mall in Chaoyang District, Beijing, while the expected scenario information may be food and beverage, shopping, drug store, fruit, supermarket, etc.

In some embodiments, the attribute information of the payment machine may include positioning information and timestamp information in use. The system for providing the positioning information may include, but is not limited to, a satellite, mobile network base station, WiFi, UWB, or LBS for knowing the current geographic position, such as a GPS, Beidou, or base station-based positioning system and the like. In one embodiment, the low-power-consumption monitoring device is provided with a positioning functional module configured to determine, in real time, current geographic position information of the payment machine, and write the current geographic position information into the attribute information for sending out as the positioning information. In another embodiment, the low-power-consumption monitoring device may include a clock control module configured to provide timestamp information. The timestamp information is added to the attribute information that is sent out in a low-power-consumption communication mode, thereby indicating the active level and operating situation of the payment machine.

In some embodiments, the low-power-consumption monitoring device and the payment machine are physically deployed together in use. For example, the payment machine 2 is deployed within a predetermined distance from the low-power-consumption monitoring device 3. Furthermore, there may be a data interaction channel between the low-power-consumption monitoring device and the payment machine for monitoring, in a low-power-consumption manner, that the device obtains positioning information or other scenario information of the payment machine. The data interaction channel may be a channel that is constantly on, a channel that is intermittently on, or a channel that is on when required.

In some embodiments, step S303 that the mobile terminal receives the attribute information of the payment machine that is sent by the low-power-consumption monitoring device in a low-power-consumption communication mode and forwards the attribute information to the cloud server may further include: the mobile terminal identifying the attribute information sent by the low-power-consumption monitoring device in a low-power-consumption communication mode, and sending the identified attribute information to the server. The server may be a cloud server. The mobile terminal is a user terminal connected to a mobile network and has low-power-consumption communication functions for connection with other low-power-consumption communication devices. The mobile terminal includes, but is not limited to, a mobile phone, iPad, tablet computer, laptop computer, etc., and may be other electronic devices, which is not limited in the present specification.

The mobile terminal may include software or APP for payment to provide payment information of a corresponding amount in the payment, which is presented to or provided as an input for the payment machine. For example, the mobile terminal provides payment codes, coupon codes, or online payment codes for the payment machine to collect. The payment information on the mobile terminal may be in a form of digital sequence, 2D code, barcode, special pattern, or other stipulated data formats. On this basis, the mobile terminal also has a function of performing low-power-consumption communication with the low-power-consumption monitoring device to receive the attribute information sent by the low-power-consumption monitoring device and forwarding the attribute information to the cloud server for reporting.

In one embodiment, the time for the mobile terminal to receive the attribute information sent by the low-power-consumption monitoring device in a low-power-consumption communication mode, and/or the time for the mobile terminal to forward the attribute information to the cloud server for reporting, may be before the mobile terminal performs the above payment transaction, during the process of the payment transaction, or after the payment transaction, which is not limited in the present specification. In some embodiments, the mobile terminal may be a mobile terminal used by the user for payment or another mobile terminal supporting low-power-consumption communications. In some other embodiments, the mobile terminal can provide a function for receiving the attribute information of the payment machine and forwarding the attribute information to the cloud server. In yet other embodiments, this function may be provided by payment software or an APP in the mobile terminal. In still other embodiments, the mobile terminal may include a terminal adaptation module, which can receive the attribute information of the payment machine from the low-power-consumption monitoring device and send the attribute information to the server.

In another embodiment, the attribute information of the payment machine transmitted in a low-power-consumption communication mode between the low-power-consumption monitoring device and the mobile terminal may be in a form of plaintext or a form of encrypted cyphertext. If the plaintext form is used, an encryption functional module may be omitted in the low-power-consumption monitoring device, which leads to an easy implementation and relatively low cost. In some embodiments, to ensure that the attribute information of the payment machine is safe and not tampered with, the attribute information transmitted by the low-power-consumption monitoring device may be transmitted in the cyphertext form. A mobile terminal correspondingly supporting the transmission in a low-power-consumption communication mode and capable of decrypting cyphertext can identify the content of the attribute information when the attribute information is received, and then forward the attribute information to a corresponding server, such as the cloud server, for processing. The cloud server may also be one server or a cluster of a plurality of servers for supporting data interaction processing sent from the mobile terminal.

Data transmission between the mobile terminal and the cloud server may be performed by means of mobile communication and/or a wireless network, and the data transmission further comprises a mobile terminal to receive the attribute information of the payment machine in a low-power-consumption communication mode, while the attribute information of the payment machine sent by the mobile terminal to the cloud server may also be in a form of plaintext or cyphertext.

In some embodiments, step S304 may further include: the server, such as the cloud server, extracting, from the attribute information, one or more pieces of information to monitor the operation status of the payment machine. The one or more pieces of information may include machine model, production date, hardware function, firmware version, unique identification ID, expected deployment location and/or expected scenario information, and positioning information and timestamp information used by the payment machine. The cloud server may be a network server or a cluster server, and the cloud refers to cloud service functions. In some embodiments, after the mobile terminal provides the payment machine with payment information of a corresponding transaction amount, the transaction server receives feedback from the host that the transaction-related data has been processed, and then notifies the corresponding user mobile terminal that the payment action has been completed. The mobile terminal further receives and identifies the attribute information sent by the low-power-consumption monitoring device in a low-power-consumption communication mode, and then forwards the attribute information to the cloud server. Based on the most recently reported attribute information of the payment machine, the cloud server extracts one or more pieces of information including: machine model, production date, hardware function, firmware version, unique identification ID, expected deployment location and/or expected scenario information, positioning information and timestamp information thereof, and monitors and updates the operation status of the corresponding payment machine in a database. For a payment machine corresponding to continuous reporting of attribute information having new timestamp information, the cloud server labels it as in an active state (or an in-use state) in the database. For a payment machine corresponding to no reporting of attribute information having new timestamp information for a period exceeding a predetermined time interval, the cloud server labels it as in an inactive state (or a non-use state). For a payment machine corresponding to the first reporting of attribute information, the cloud server labels it as in a newly activated state and records its timestamp information as the time of first use of the payment machine.

In one embodiment, the cloud server may perform real-time comparison or sampling to check whether the positioning information in the attribute information of each payment machine in a report by the low-power-consumption monitoring device is consistent with its expected deployment location information. In case of inconsistency, it is necessary to label the payment machine as to be checked by a field visit in the database. Whether the payment machine is changed in usage without authorization or the inconsistency is caused by errors in information entry during deployment can be determined through further verification. Therefore, the accurate operation status of each payment machine can be effectively monitored.

Based on such understanding, the implementation of all or a part of the flow in the method according the above-described third embodiment in the present specification may also be completed by a computer program instructing relevant hardware. The computer program may be stored in a computer readable storage medium, and when executed by a processor, the computer program may implement the steps of all the above method embodiments. Here, the computer program comprises computer program code, and the computer program code may be in a form of source code, object code, executable file, or some intermediate forms. The computer readable medium may include any entity or device capable of carrying the computer program code, a medium, a flash drive, a portable hard drive, a magnetic disk, an optical disk, a computer memory, Read-Only Memory (ROM), Random Access Memory (RAM), an electrical carrier signal, a telecommunication signal, and software distribution medium. It should be noted that the content of the computer readable medium can be properly added or deleted according to requirements by the law and patent practices in a jurisdiction. For example, in some jurisdictions, the computer readable medium does not include electrical carrier signal or telecommunication signal according to the law and patent practices.

Although some embodiments of the present specification have been described, those skilled in the art may make additional amendments and modifications to these embodiments once they learn about the basic inventive concepts. Therefore, the appended claims are intended to be construed as encompassing the preferred embodiments and all amendments and modifications that fall in the scope of the present specification.

Obviously, those skilled in the art may make various modifications and variations to the present specification without departing from the spirit and scope of the present specification. In this way, if these modifications and variations to the present specification fall within the claims of the present specification and equivalent technologies thereof, the present specification also attempts to encompass these modifications and variations.

What is claimed is:

1. A method for monitoring a payment machine, implemented by a monitoring device, comprising:
  monitoring a payment machine's interaction with a mobile terminal for collecting payment information from the mobile terminal, wherein the interaction is independent of the monitoring device;
  determining a communication time interval based on a transaction time associated with the interaction between the payment machine and the mobile terminal, wherein the communication time interval is shorter than the transaction time;
  obtaining current geographic position information of the payment machine and a current timestamp;
  in response to determining that the payment machine is collecting payment information from the mobile terminal, sending, in a low-power-consumption communication mode and at the determined communication time interval, attribute information of the payment machine to the mobile terminal, causing the mobile terminal to send the attribute information to a server for monitoring an operation status of the payment machine, wherein the attribute information comprises:
    the obtained geographic position information and the timestamp, and
    a unique identification ID and an expected deployment location of the payment machine that are written in an internal memory of the monitoring device.

2. The method of claim 1, wherein the payment machine is offline.

3. The method of claim 1, wherein the attribute information of the payment machine further comprises one or more of a machine model, production date, hardware function, a firmware version, and expected scenario information of the payment machine.

4. The method of claim 1, further comprising, subsequent to obtaining current geographic position information of the payment machine and a current timestamp:
  updating the attribute information of the payment machine with the obtained current geographic position information and the current timestamp.

5. The method of claim 1, wherein the sending, in a low-power-consumption communication mode, attribute information of the payment machine to the mobile terminal comprises:
sending the attribute information of the payment machine using Bluetooth, NB-IoT, or CAT M1.

6. The method of claim 1, wherein the sending attribute information of the payment machine to the mobile terminal comprises:
sending encrypted cyphertext of the attribute information of the payment machine to the mobile terminal.

7. The method of claim 1, wherein the payment machine is within a predetermined distance from the monitoring device.

8. A method for monitoring a payment machine, comprising:
interacting, by the payment machine with a mobile terminal, to collect payment information from the mobile terminal, wherein the interaction is independent of a monitoring device;
sending, by the payment machine, the payment information to a host for processing an offline payment;
monitoring, by the monitoring device, the payment machine's interaction with the mobile terminal to obtain the payment information;
determining, by the monitoring device, a communication time interval based on a transaction time associated with the interaction between the payment machine and the mobile terminal, wherein the communication time interval is shorter than the transaction time;
obtaining, by the monitoring device, current geographic position information of the payment machine and a current timestamp;
sending, by the monitoring device, in a low-power-consumption communication mode, attribute information of the payment machine to the mobile terminal, wherein the attribute information comprises:
the obtained geographic position information and the timestamp, and
a unique identification ID and an expected deployment location of the payment machine that are written in an internal memory of the monitoring device; and
sending, by the mobile terminal, the attribute information to a server for monitoring an operation status of the payment machine.

9. The method of claim 8, wherein the attribute information of the payment machine further comprises one or more of a machine model, production date, hardware function, a firmware version, and expected scenario information of the payment machine.

10. The method of claim 8, wherein at least part of the attribute information of the payment machine is stored on the monitoring device during pre-deployment.

11. The method of claim 8, wherein the payment machine is deployed within a predetermined distance from the monitoring device.

12. The method of claim 8, further comprising, subsequent to obtaining current geographic position information of the payment machine and a current timestamp:
updating the attribute information of the payment machine with the obtained current geographic position information and the current timestamp on the monitoring device.

13. The method of claim 8, wherein the sending, by the monitoring device, in a low-power-consumption communication mode, attribute information of the payment machine to the mobile terminal comprises:
sending the attribute information of the payment machine using Bluetooth, NB-IoT, or CAT M1.

14. The method of claim 8, wherein the sending, by the monitoring device, attribute information of the payment machine to the mobile terminal comprises:
sending encrypted cyphertext of the attribute information of the payment machine to the mobile terminal.

15. A device for monitoring a payment machine, comprising one or more processors and one or more non-transitory computer-readable memories coupled to the one or more processors and configured with instructions executable by the one or more processors to perform operations comprising:
monitoring a payment machine's interaction with a mobile terminal for collecting payment information from the mobile terminal, wherein the interaction is independent of the monitoring device;
determining a communication time interval based on a transaction time associated with the interaction between the payment machine and the mobile terminal, wherein the communication time interval is shorter than the transaction time;
obtaining current geographic position information of the payment machine and a current timestamp;
in response to determining that the payment machine is collecting payment information from the mobile terminal, sending, in a low-power-consumption communication mode and at the determined communication time interval, attribute information of the payment machine to the mobile terminal, causing the mobile terminal to send the attribute information to a server for monitoring an operation status of the payment machine, wherein the attribute information comprises:
the obtained geographic position information and the timestamp, and
a unique identification ID and an expected deployment location of the payment machine that are written in an internal memory of the monitoring device.

16. The device of claim 15, wherein the attribute information of the payment machine further comprises one or more of a machine model, production date, hardware function, a firmware version, and expected scenario information of the payment machine.

17. The device of claim 15, wherein the operations further comprise, subsequent to obtaining current geographic position information of the payment machine and a current timestamp:
updating the attribute information of the payment machine with the obtained current geographic position information and the current timestamp.

18. The device of claim 15, wherein the sending, in a low-power-consumption communication mode, attribute information of the payment machine to the mobile terminal comprises:
sending the attribute information of the payment machine using Bluetooth, NB-IoT, or CAT M1.

19. The device of claim 15, wherein the sending attribute information of the payment machine to the mobile terminal comprises:
sending encrypted cyphertext of the attribute information of the payment machine to the mobile terminal.

20. The device of claim 15, wherein the payment machine is within a predetermined distance from the monitoring device.

* * * * *